US010706289B2

(12) United States Patent
Dhua et al.

(10) Patent No.: US 10,706,289 B2
(45) Date of Patent: Jul. 7, 2020

(54) CROWD DETECTION, ANALYSIS, AND CATEGORIZATION

(71) Applicant: INTERNATIONAL BUSINESS MACHINES CORPORATION, Armonk, NY (US)

(72) Inventors: Silpi Dhua, Bankura (IN); Anil M. Omanwar, Pune (IN); Sujoy Sett, Kolkata (IN); Pradip A. Waykos, Chikhli (IN)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 15/448,848

(22) Filed: Mar. 3, 2017

(65) Prior Publication Data
US 2018/0253605 A1    Sep. 6, 2018

(51) Int. Cl.
G06K 9/00    (2006.01)
B64C 39/02    (2006.01)
(Continued)

(52) U.S. Cl.
CPC ........ G06K 9/00778 (2013.01); *B64C 39/024* (2013.01); *G05D 1/0094* (2013.01);
(Continued)

(58) Field of Classification Search
CPC combination set(s) only.
See application file for complete search history.

(56) References Cited

U.S. PATENT DOCUMENTS 8,989,922 B2    3/2015  Jones et al.
2012/0274775 A1  11/2012  Reiffel
(Continued)

FOREIGN PATENT DOCUMENTS

CN    102654940 B    5/2014

OTHER PUBLICATIONS

4Quant, "People Video Analytics," 4Quant Drone People Counting, Jul. 24, 2015, p. 1-13, http://4quant.com/Drone-People-Counting/#learn-more, Accessed on Feb. 23, 2017.
(Continued)

*Primary Examiner* — Alexandru Cirnu
(74) *Attorney, Agent, or Firm* — Robert C. Bunker

(57) ABSTRACT

A method, computer system, and a computer program product for analyzing a crowd using a plurality of images captured by an aerial drone is provided. The present invention may include determining a geographic area associated with the crowd. The present invention may also include partitioning the determined geographic area into a plurality of zones. The present invention may then include determining a flight path covering each zone within the plurality of zones. The present invention may further include receiving the plurality of images from the aerial drone. The present invention may also include analyzing the received plurality of images to identify a plurality of individuals associated with the crowd. The present invention may then include predicting a plurality of crowd characteristics based on the analyzed plurality of images. The present invention may further include performing an action in response to the predicted plurality of crowd characteristics.

4 Claims, 6 Drawing Sheets

(51) Int. Cl.
*G06F 16/583* (2019.01)
*G05D 1/00* (2006.01)
*G08G 5/00* (2006.01)
*G06Q 30/02* (2012.01)
*G06K 9/46* (2006.01)
*G06K 9/32* (2006.01)

(52) U.S. Cl.
CPC ...... *G06F 16/583* (2019.01); *B64C 2201/127* (2013.01); *G06K 9/3233* (2013.01); *G06K 9/4642* (2013.01); *G06Q 30/0241* (2013.01); *G08G 5/0069* (2013.01)

(56) References Cited

U.S. PATENT DOCUMENTS

| | | | |
|---|---|---|---|
| 2015/0332087 A1* | 11/2015 | Joshi | G06K 9/00 382/203 |
| 2016/0028471 A1 | 1/2016 | Boss et al. | |
| 2016/0358190 A1 | 12/2016 | Terrazas et al. | |
| 2017/0053169 A1* | 2/2017 | Cuban | H04N 7/185 |
| 2017/0083748 A1* | 3/2017 | Zhou | G06T 7/248 |

OTHER PUBLICATIONS

Calistra, "Anonymous Video Analytics (AVA) Technology & Privacy," Kairos Human Analytics Blogs, Mar. 26, 2015, p. 1-10, Kairos AR, Inc., https://www.kairos.com/blog/155-anonymous-video-analytics-ava-technology-privacy, Accessed on Feb. 23, 2017.

Khaleghi et al., "A DDDAMS-Based Planning and Control Framework for Surveillance and Crowd Control via UAVs and UGVs," Expert Systems with Applications, Dec. 15, 2013, p. 7168-7183, vol. 40, Issue 18, Elsevier Ltd.

Khaleghi et al., "A Dddams-Based UAV and UGV Team Formation Approach for Surveillance and Crowd Control," Proceedings of the 2014 Winter Simulation Conference, 2014, p. 2907-2918, IEEE.

Mell et al., "The NIST Definition of Cloud Computing," National Institute of Standards and Technology, Sep. 2011, p. 1-3, Special Publication 800-145.

Quaritsch et al., "Fast Aerial Image Acquisition and Mosaicking for Emergency Response Operations by Collaborative UAVs," Proceedings of the 8th International ISCRAM Conference, May 2011, p. 1-5, Lisbon, Portugal.

IBM, "List of IBM Patents or Patent Applications Treated as Related (Appendix P)," May 21, 2018, p. 1-2.

Dhua et al., "Crowd Detection, Analysis, and Categorization," Application and Drawings, filed Sep. 28, 2017, 29 Pages, U.S. Appl. No. 15/718,113.

* cited by examiner

CROWD DETECTION, ANALYSIS, AND CATEGORIZATION

BACKGROUND

The present invention relates generally to the field of computing, and more particularly to crowd analysis.

Photography and videography-based applications have gained popularity in the past decade for administrative and security purposes resulting in the prevalence of security cameras and equipment in public areas. Existing applications may mostly be based on fixed imagery angles from pre-aligned cameras or cameras with limited movement. Furthermore, camera output may require manual observation to derive information or to make decisions.

SUMMARY

Embodiments of the present invention disclose a method, computer system, and a computer program product for analyzing a crowd using a plurality of images captured by an aerial drone. The present invention may include determining a geographic area associated with the crowd. The present invention may also include partitioning the determined geographic area into a plurality of zones. The present invention may then include determining a flight path covering each zone within the plurality of zones. The present invention may also include sending the determined flight path to the aerial drone. The present invention may further include receiving the plurality of images from the aerial drone. The present invention may also include analyzing the received plurality of images to identify a plurality of individuals associated with the crowd. The present invention may then include predicting a plurality of crowd characteristics based on the analyzed plurality of images. The present invention may further include performing an action in response to the predicted plurality of crowd characteristics.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
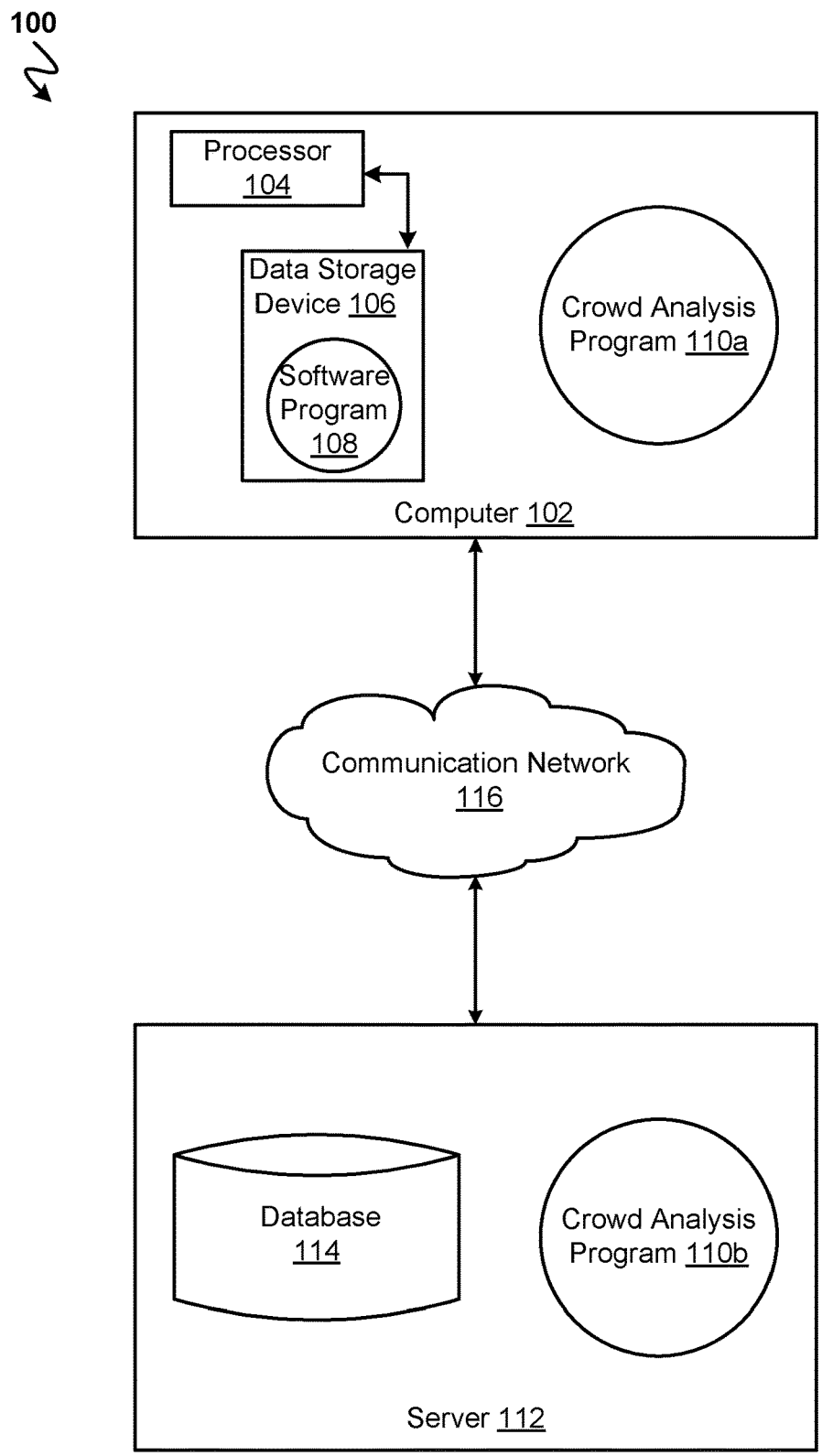
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Photography and videography-based applications have gained popularity in the past decade for administrative and security purposes resulting in the prevalence of security cameras and equipment in public areas. Existing applications may mostly be based on fixed imagery angles from pre-aligned cameras or cameras with limited movement. Furthermore, camera output may require manual observation to derive information or to make decisions. Therefore, it may be advantageous to, among other things, provide a way to monitor crowds of people using a mobile image capturing device capable of capturing images from an altitude, such as an aircraft with a camera, and automatically analyze the camera output to make decisions in response to the characteristics of the crowd.

The following described exemplary embodiments provide a system, method and program product for monitoring a crowd using a device for capturing images from an altitude, such as aircraft and aerial unmanned vehicles (UAVs) or aerial drones. As such, the present embodiment has the capacity to improve the technical field of crowd analysis by monitoring crowds from images taken by aerial drones that may dynamically traverse above an area and make decisions in real-time. More specifically, a still image camera and a video camera mounted to the bottom of a controlled flight-capable aerial drone or other aircraft that may also have the capability to wirelessly transmit data of the generated images and video of a group of persons forming a crowd. From the static images taken by the drone, an image partitioning algorithm may be used to identify individuals within the crowd images. Then a pre-trained model may be used to predict the gender, age, socioeconomic status, or other attributes of the individuals from the partitioned images. From the captured video, an image partitioning algorithm may be used to identify individuals and thereby determine the rate of entry and rate of exit from a certain defined geographic area. Additionally, motion points for individuals may be plotted to determine the distribution of the mass of people gathering from the overhead video. Based on predicted crowd characteristics drawn from predicted individual characteristics, decisions may be made in real-time for advertising, security, or some other purpose.

The present embodiment may be used to derive insights from a mass gathering of people by categorizing the mass of people and analyzing the motion of the mass by zoning a geographic area. Drones equipped with flight and imagery capabilities may be used to generate the data for analyzing the mass of people. By using aircraft, overhead images may be generated that provide a better position to assess the characteristics of the crowd and track individuals within the crowd. Furthermore, aircraft may have fewer obstacles to navigate around to capture images of the crowd. The present embodiment may be useful for security enforcement by reducing the number of personnel that may need to be deployed to monitor crowds. The present embodiment may also help advertisers to analyze a target mass of individuals and perform categorized advertisement that may be more effective given the derived crowd characteristics.

According to at least one embodiment, the operational area over a mass gathering is first determined. Then, the target geographical area may be defined by a polygon with coordinates. Next, the drone takes the area as input and partitions the area into smaller zones. The drone then traverses the area using a traversing algorithm to move and position the drone over the zones according to the algorithm. For each zone, the drone captures images (e.g., 2-5 images) at a predefined time interval (e.g., 2-10 seconds). Thereafter, image processing steps may be performed for each of the images in the sequence of captured images. Images may be partitioned to create top-level images of each individual within the crowd. A trained model may then process the partitioned images to predict features (e.g., gender, age, and direction the person is facing) of every individual. Best match algorithms may then be used to identify every individual across the sequence of captured images. From the sequential images or from captured video, the motion direction of each individual may be determined. Then, aggregate motion information, categorization, and concentration of the entire crowd may be determined from captured still images or video based on analysis of the constituent individuals within the crowd and observing the movement of the crowd as a whole. Next, according to one embodiment, business intelligence may be used to decide placement and duration of dynamic advertisements. According to at least one other embodiment, expert knowledge may be used to decide administrative control and measures over the mass gathering of people.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a crowd analysis program 110a. The networked computer environment 100 may also include a server 112 that is enabled to run a crowd analysis program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, an aerial drone flight computer, or any type of computing devices capable of running a program, accessing a network, and accessing a database 114. According to various implementations of the present embodiment, the crowd analysis program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the crowd analysis program 110a, 110b (respectively) to monitor crowds of people using images taken from an aerial drone and analyze the images of the crowd to determine risks or targeted advertisements in real-time. The crowd analysis method is explained in more detail below with respect to FIG. 3.

Figure 2:
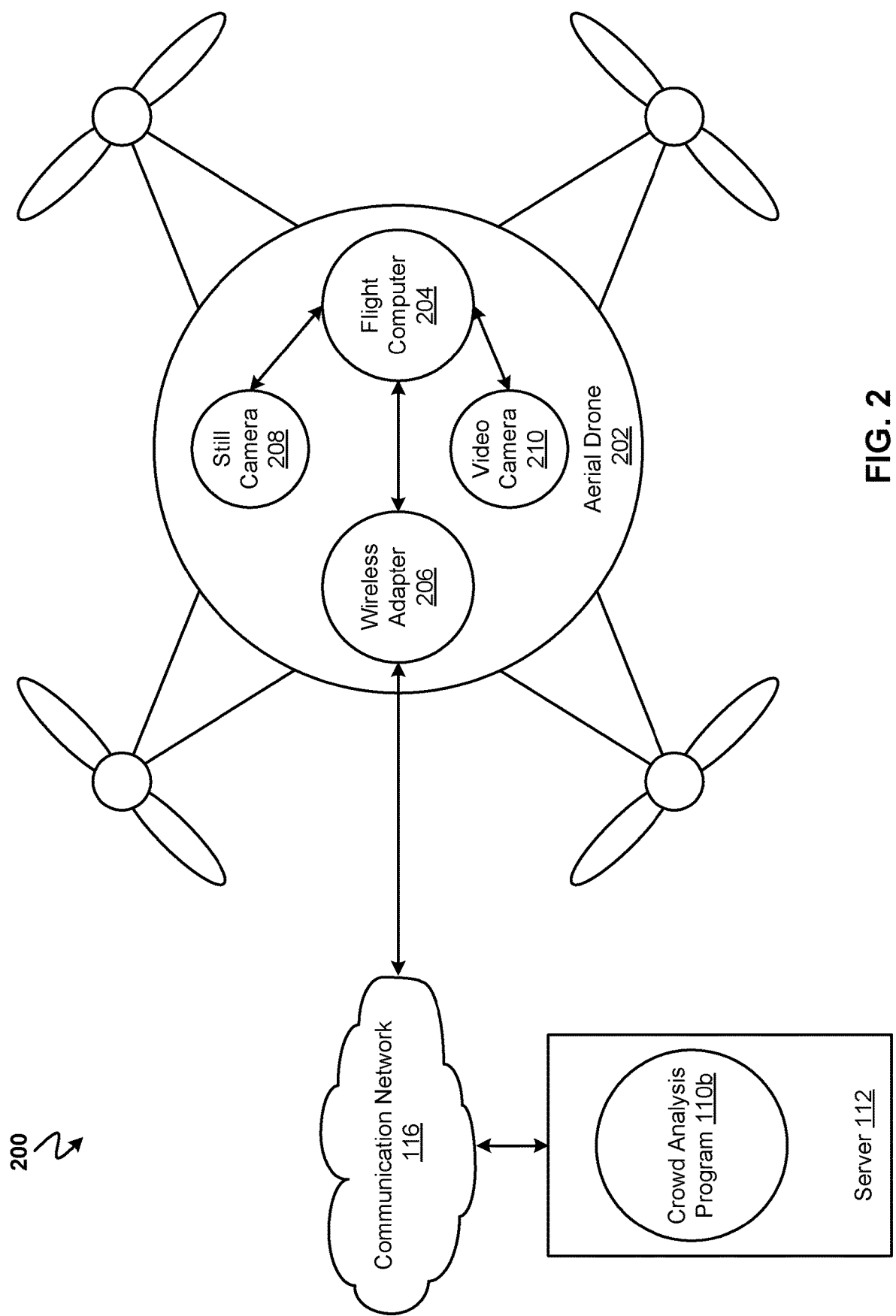
FIG. 2 illustrates a networked aerial image capture device system according to at least one embodiment.

Referring now to FIG. 2, a networked aerial image capture device system 200 according to at least one embodiment is depicted. The networked aerial image capture device system 200 may include a server 112 running the crowd analysis program 110b, a communication network 116, and an aerial drone 202 (i.e., aerial image capturing device). The aerial drone 202 may include a flight computer 204, a wireless adapter 206, a still camera 208, and a video camera 210.

The crowd analysis program 110b running on the server 112 may communicate via the communication network 116 with the wireless adapter 206 of the aerial drone 202. The communication network 116 may include wireless connections, such as wi-fi or satellite communication. For example, the crowd analysis program 110b may generate a flight path and transmit the generated flight path using the communication network 116 to the wireless adapter 206 within the aerial drone 202. The wireless adapter 206 may send and receive data wirelessly using the communication network 116 and the wireless adapter 206 may also interact with the flight computer 204.

The flight computer 204 may be a computer 102 designed to control the aerial drone 202 in flight by keeping the aerial drone 202 level and flying the aerial drone 202 according to a flight path. Furthermore, the flight computer 204 may control onboard sensors, such as the still camera 208 and video camera 210 attached to the bottom of the aerial drone 202. The flight computer 204 may send the still camera 208 and the video camera 210 instructions to move to point in a specific direction and when to capture images. Images captured by the still camera 208 and the video camera 210 may be sent to the flight computer 204 for storage and transmission. The flight computer 204 may then relay the captured images to the wireless adapter 206. Then, the wireless adapter 206 may transmit the images using the communication network 116 to the crowd analysis program 110b running on the server 112 for analysis.

Figure 3:
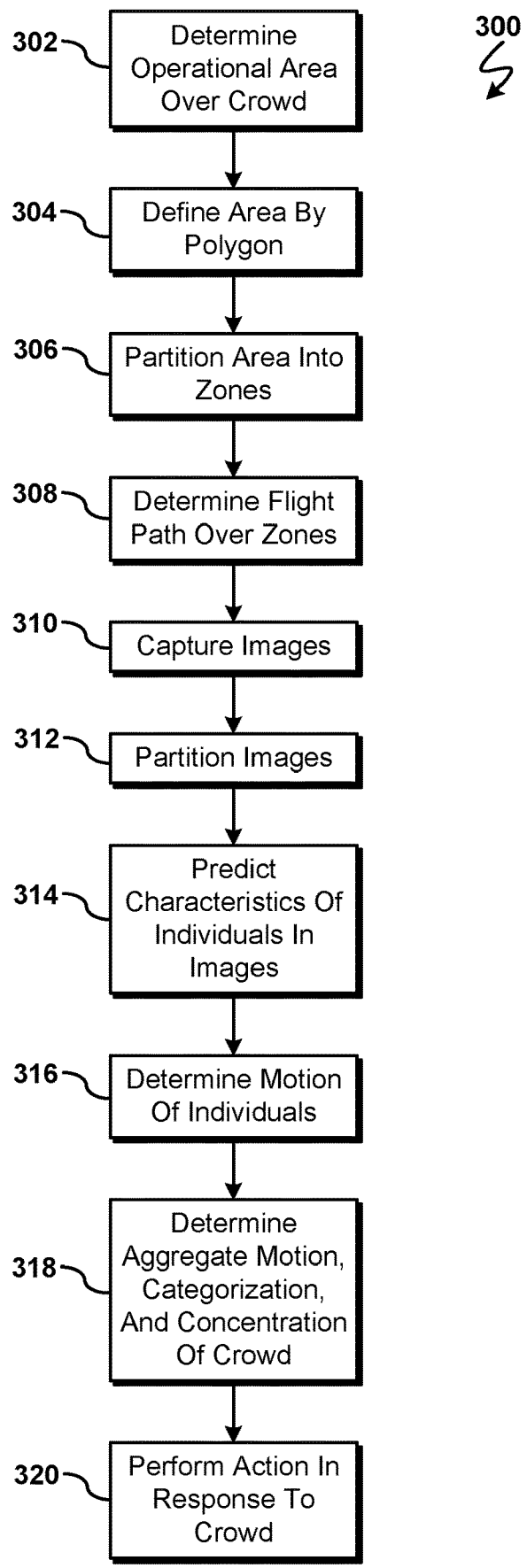
FIG. 3 is an operational flowchart illustrating a process for crowd analysis according to at least one embodiment.

Referring now to FIG. 3, an operational flowchart illustrating the exemplary crowd analysis process 300 used by the crowd analysis program 110a and 110b according to at least one embodiment is depicted.

At 302, an operational geographic area over a crowd of gathered people is determined. The operational geographic area may be determined based on input from a user, a warning from fixed sensors near the geographic area, and so on. For example, a city park may be designated as the operational geographic area by a user.

Next, at 304, the geographic area is defined by a polygon. Using known methods, the operational geographic area may be represented as a polygon with a set of geographic coordinates. For example, if the city park that was designated as the geographic area is approximately rectangular in shape, then the geographic coordinates of the four corner points may be determined and saved as a set of geographic coordinates. From the saved geographic coordinates, a polygon corresponding with the city park may be defined that may be used as input into drone controlling software.

Then, at 306, the polygon representing the geographic area is partitioned into zones. The geographic area may be partitioned into smaller geographic subdivisions or zones to efficiently analyze the total operational geographic area. The partitioning may include pure hexagonal or Cairo pentagonal zones and a set of coordinates may be determined for the aerial drone 202 to be positioned for each zone. Continuing the previous example, the city park may be subdivided into four zones, such as zones $Z_1$, $Z_2$, $Z_3$, and $Z_4$, with each zone having at least one position coordinate associated with the zone.

At 308, a flight path over the zones is determined. Once the geographic area is subdivided into zones as described previously at 306, a flight path may be determined for the aerial drone 202 to fly over all of the zones, thus covering the original geographic area. The aerial drone 202 may start from a point close to the area of operation. A best route algorithm may be used to generate the flight path for the aerial drone 202 to visit each position coordinate within the set of position coordinates. For example, if the area of operation for the aerial drone 202 is nearest $Z_3$, then, based on executing a best route algorithm, the determined flight path may create a path from $Z_3$ to $Z_2$, from $Z_2$ to $Z_4$, and then from $Z_4$ to $Z_1$. More specifically, the determined flight path may plot the flight path to the position coordinate of $Z_3$, then to the position coordinate for $Z_2$, then to the position coordinate for $Z_4$, and finally to the position coordinate for $Z_1$. Furthermore, the height or altitude of the aerial drone 202 may be set as part of the flight path with differing altitudes at various points along the flight path to circumvent obstacles or provide a more appropriate image resolution given a zone size.

Next, at 310, the aerial drone 202 will fly according to the determined flight path and capture images of the crowd of people. As described previously, a server 112 running the crowd analysis program 110b may wirelessly transmit the determined flight path to the wireless adapter 206 of the aerial drone 202 using the communication network 116. The aerial drone 202 may perform self-controlled operation (i.e., autonomous flying) according to the received flight path using the flight computer 204. As the aerial drone 202 flies along the determined flight path, still images may be captured at predefined time intervals using the still camera 208 and video may be captured simultaneously using the video camera 210. Additionally, the aerial drone 202 may loop through the flight path continuously throughout the aerial drone's 202 operating time. As the aerial drone 202 flies to a position coordinate, a predefined number of still images, such as two, may be captured at a predefined time interval, such as two seconds apart, in addition to capturing video footage before the drone moves on to the next position coordinate in the flight path. The aerial drone's 202 results may then be displayed in a dashboard or other drone software.

Then, at 312, the captured images are partitioned. The captured images may be transmitted wirelessly to a server 112 for processing from the wireless adapter 206 of the aerial drone 202 using a communication network 116. At the server 112, the images may be partitioned using a partitioning algorithm to create images corresponding with each unique individual within the set of images generated by the aerial drone 202. The partitioning algorithm may identify geometry or other patterns consistent with the silhouette of a person or by detecting features consistent with a face, or by some other method. The image may then be partitioned by cropping or delineating a region within an image to include a single individual per partition. For example, a still image from zone $Z_2$ may be processed using a partitioning algorithm that identifies twenty individuals. The partitioning algorithm would then create twenty partitions from the still image with each partition including a single individual. Image partitioning may be performed in a like manner for each image of every zone until all images have been similarly partitioned.

At 314, the characteristics of the individuals in the partitioned images are predicted. Using a pre-trained machine learning model, individual partitioned images may be analyzed to determine characteristics of the person within each partitioned image. Determined characteristics may include, for example, demographics, such as age and gender. Additionally, the determined characteristics may include other physical characteristics, such as height, weight, and direction the individual is facing, and other characteristics about an individual that may be derived from analyzing an image. Furthermore, based on the location and orientation of the aerial drone 202 when the picture was taken, the geographic location of the area being photographed, and the position of the individual within the image, the geographic location of the individual may be determined. The determined characteristics may then be saved as metadata. Thereafter, the images may be appended with the metadata, including the individual's age, gender, facing direction, location, and so on. Alternatively, the metadata may be saved in a data structure, such as an array, with a pointer or other indicator to an individual in a partitioned image.

Next, at 316, the motion of the individuals in the images is determined. By comparing the position of individuals from one partitioned image to a second partitioned image of the same individual, the movement direction and speed of each individual may be tracked to determine an individual movement vector indicating the movement direction and speed of the individual. For example, if an individual appears in the center of a first image and the same individual appears in the bottom-right portion in a second image, then the individual has moved in a northeast direction based on the known position and orientation of the aerial drone 202 and still camera 208 when the images were generated. Alternatively, by comparing the time the still images were taken to the same time in the video footage, individuals may be identified within the video since the still camera 208 and the video camera 210 may be mounted in close proximity and therefore individuals may appear in similar positions in the still images and the video generated at the same time. Thus, using the video, an individual's movement may be determined by tracking the change in the position of the individual in the video footage.

Then, at 318, the aggregate motion, categorization, and concentration of the crowd may be determined. Based on the movement of the individuals within the crowd, the composite motion of the crowd in general may also be determined. For example, by comparing the movement of multiple individuals, a point of convergence may be determined at a central location or a direction the crowd of people may be moving towards that may be expressed as a crowd movement vector. Furthermore, the crowd concentration may be determined based on each individual's position within the defined geographic area which may then be plotted as points. Based on the density of the plotted points and movement of points corresponding to individuals, the mass movement of the crowd may also be deduced by the rate of entry and exit from a certain area of the zone. Furthermore, based on the characteristics of the individuals determined at 314, the characteristics of the collective crowd may be determined to categorize the crowd. For example, if 88% of the individuals are estimated to be within the ages of 16 to 25, the crowd may be categorized as a crowd of a younger demographic of people.

At 320, an action is taken in response to the information determined about the crowd. Business intelligence may be applied to the aggregate motion, categorization, and concentration of the crowd. Based on the results from the applied business intelligence, an advertiser may decide on a particular advertising strategy and advertise to the crowd in real-time. Continuing the previous example, if the crowd was categorized as a crowd of younger people, specific advertising may be delivered to the individuals in the crowd that is tailored for individuals within the crowd's age demographic. The advertising may be electronically delivered to the mobile devices of the individuals within the crowd, or by contacting personnel amongst the crowd by radio, text message, and so forth to distribute tangible advertising, such as flyers, that may be most effective given the crowd characteristics.

Alternatively, the characteristics of the crowd, density, and movement may raise security concerns and police or military may respond to control the crowd, or move sensitive items or personnel for protection or to reduce any hostilities. In security applications, security intelligence may be applied to the aggregate motion, categorization, and concentration of the crowd. The resulting security intelligence analysis of the crowd information may be used by security personnel to decide which security measures should be taken and the extent, duration, and positioning of the security measures. In another scenario, event organizers may use the resulting crowd information to plan how to efficiently handle the people within the crowd or how to make changes to minimize future crowd formation and congestion.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
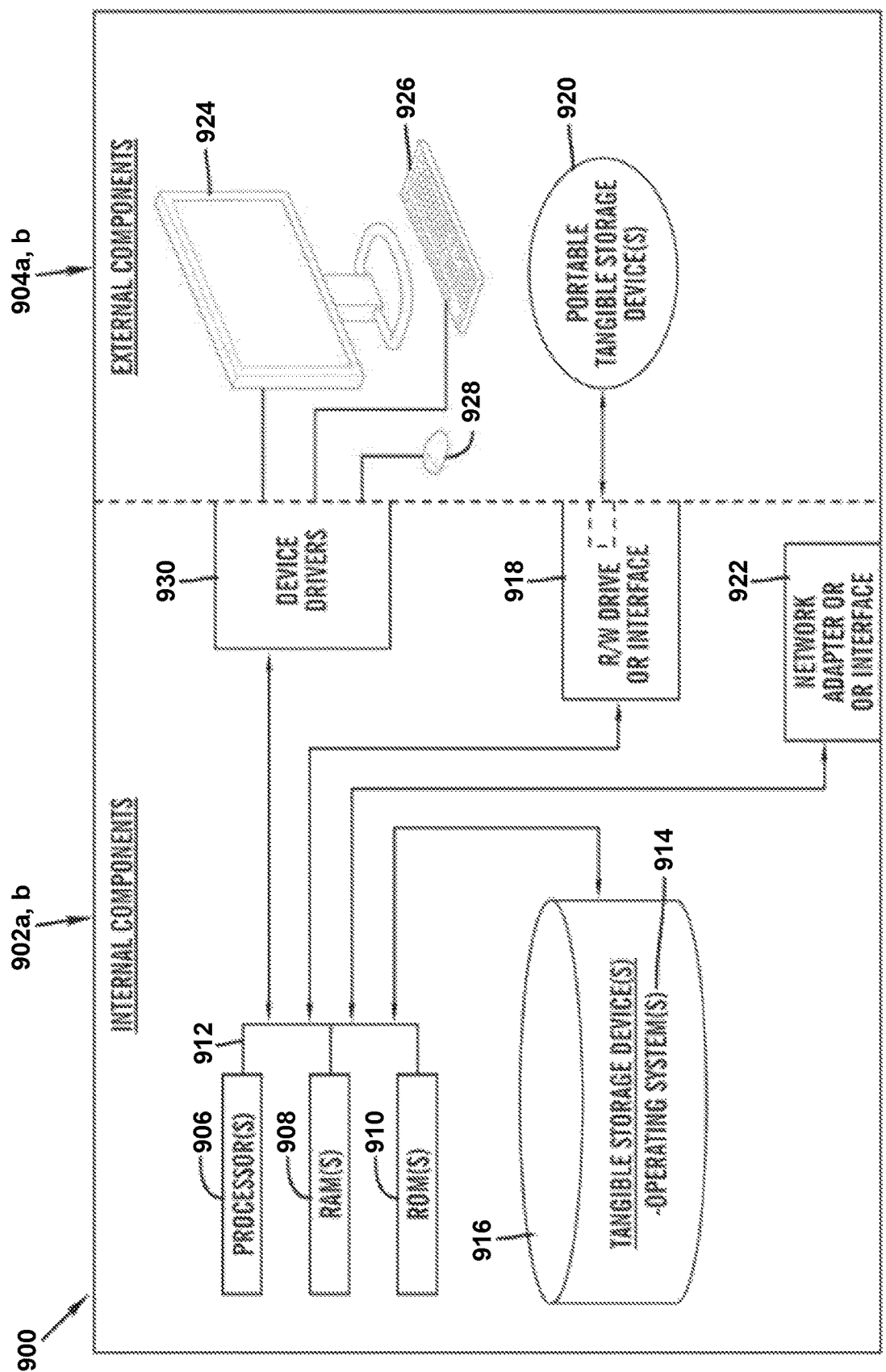
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the crowd analysis program 110a in client computer 102, and the crowd analysis program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the crowd analysis program 110a and 110b can be stored on one or more of the respective portable computer-readable tangible storage devices 920, read via the respective R/W drive or interface 918, and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the crowd analysis program 110a in client computer 102 and the crowd analysis program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the crowd analysis program 110a in client computer 102 and the crowd analysis program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
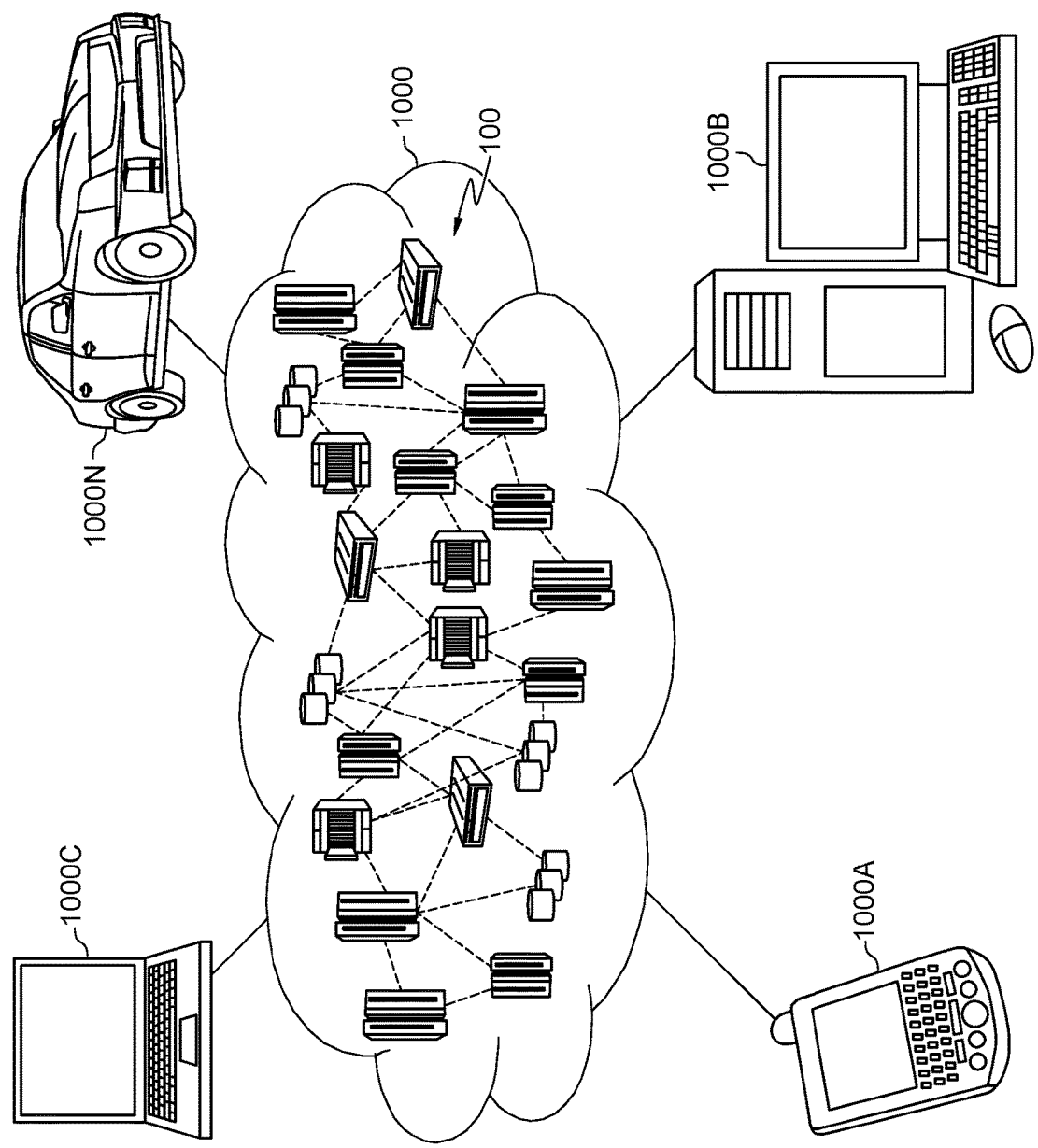
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
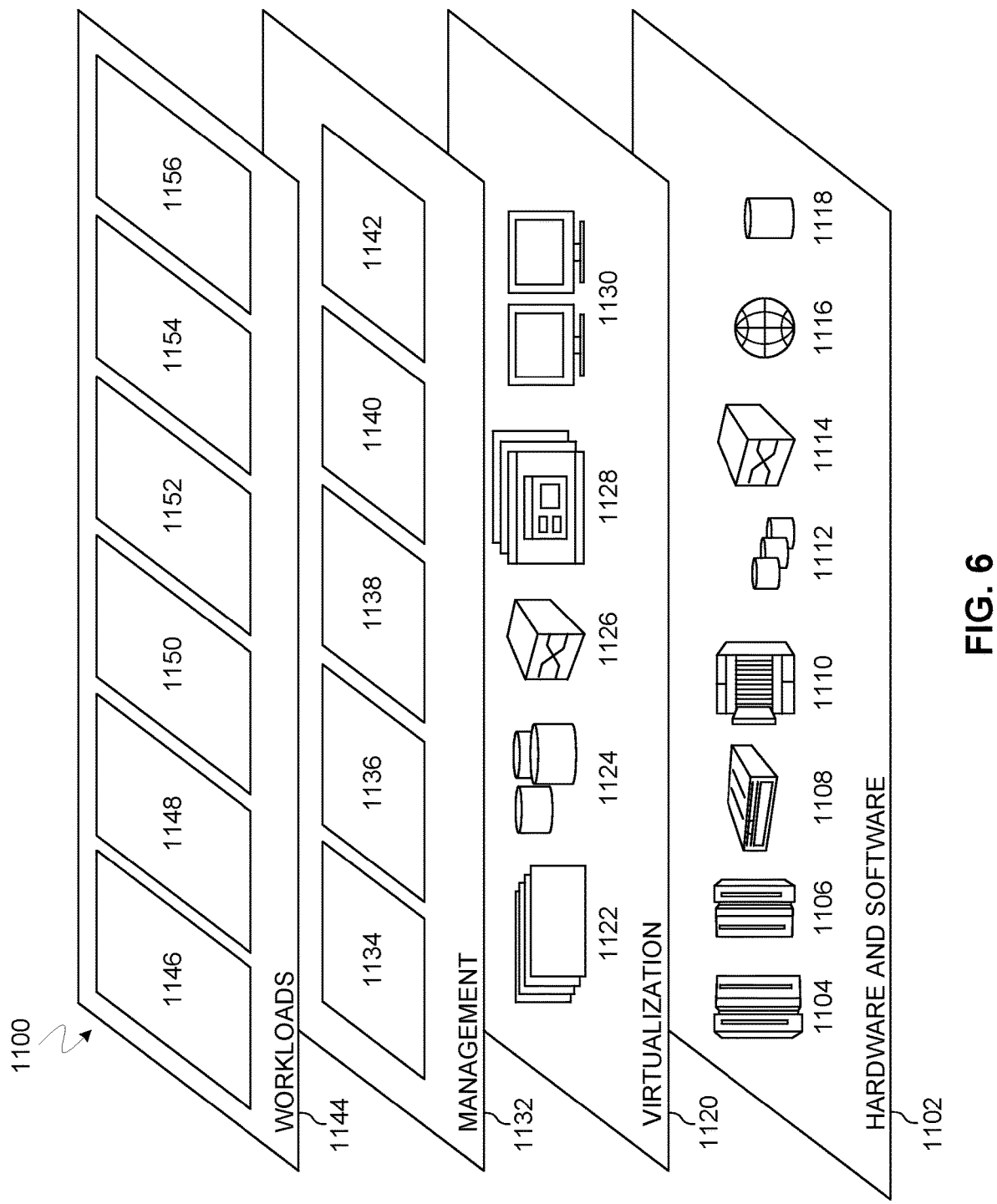
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124;

virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and crowd analysis 1156. A crowd analysis program 110a, 110b provides a way to monitor crowds of people using images taken at an altitude above the crowd from an image capturing device and analyze the images of the crowd to determine risks or targeted advertisements in real-time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for analyzing a crowd using a plurality of images captured by an aerial drone, comprising:
   a server;
   a communication network;
   the aerial drone, wherein the aerial drone comprises a flight computer, a wireless communications adapter, one or more camera sensors that capture still images and video, wherein the server is communicatively coupled to the aerial drone via the communication network using the wireless communications adapter, and wherein the wireless communications adapter is communicatively coupled to the flight computer;
   wherein the server and the aerial drone comprising the computer system include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   determining a geographic area associated with the crowd;
   partitioning the determined geographic area into a plurality of zones;
   determining a flight path covering each zone within the plurality of zones;
   sending the determined flight path to the aerial drone from the servers to the aerial drone via the communications network, wherein the determined flight path is received at the aerial drone via the wireless communications adapter and relayed to the flight computer;
   transmitting directions from the flight computer to the one or more camera sensors to point in a specific direction;
   generating, by the one or more camera sensors controlled by the flight computer of the aerial drone, the plurality of images, and a plurality of drone position data that comprises a drone location, a drone orientation, and a photographed location;
   storing, in the flight computer, the generated plurality of images and the plurality of drone position data;
   receiving, by the server via the communications network, the plurality of images and the plurality of drone position data from the aerial drone;
   analyzing the received plurality of images to identify a plurality of individuals associated with the crowd by partitioning each image within the received plurality of images based on identifying patterns matching human silhouettes to create an image partition for each identified individual within the identified plurality of individuals, wherein partitioning each image comprises cropping images to into a plurality of individual images of a single individual from the plurality of individuals;
   determining a plurality of individual demographic characteristics of the identified plurality of individuals, wherein the plurality of individual demographic characteristics are determined using a trained model;
   determining an individual geographic location for each identified individual within the identified plurality of individuals based on the analyzed plurality of images, the drone location, the drone orientation, and the photographed location;
   predicting a plurality of crowd characteristics based on the analyzed plurality of images and the determined individual geographic location for each identified individual, wherein the predicted plurality of crowd characteristics includes a plurality of collective demographic characteristics of the crowd, and wherein the plurality of collective demographic characteristics are determined based on the determined plurality of individual demographic characteristics;
   determining a placement and a duration for dynamic advertising to distribute to the crowd and tailoring the dynamic advertising for the crowd based on the predicted plurality of crowd characteristics; and
   transmitting advertising instructions for the dynamic advertising, via text message, to mobile devices of personnel, while the personnel are present amongst the crowd based on the determined placement and duration, wherein the transmitted advertising instructions indicate specific tangible advertisements to distribute to the crowd;
   distributing, by the personnel amongst the crowd, the specific tangible advertisements to the crowd based on the transmitted advertising instructions.

2. The computer system of claim 1, further comprising:
  determining an individual movement vector for each individual within the identified plurality of individuals based on tracking changes in a position of an individual from the image partitions associated with the individual.

3. The computer system of claim 2, wherein the plurality of crowd characteristics includes a crowd movement vector, and wherein the crowd movement vector is determined based on the individual movement vector for each individual within the identified plurality of individuals.

4. The computer system of claim 1, further comprising:
  flying, by the aerial drone, along the sent flight path.

\* \* \* \* \*